United States Patent [19]
Filo

[11] Patent Number: 5,079,627
[45] Date of Patent: Jan. 7, 1992

[54] VIDEOPHONE

[75] Inventor: Andrew Filo, Cupertino, Calif.

[73] Assignee: Optum Corporation, Cupertino, Calif.

[21] Appl. No.: 375,266

[22] Filed: Jun. 29, 1989

Related U.S. Application Data

[63] Continuation-in-part of Ser. No. 207,385, Jun. 15, 1988, abandoned.

[51] Int. Cl.⁵ .................. H04N 7/14; H04N 1/42
[52] U.S. Cl. ............................. 358/85; 379/53
[58] Field of Search ..................... 358/85; 379/53

[56] References Cited

U.S. PATENT DOCUMENTS

| | | | |
|---|---|---|---|
| 1,932,253 | 10/1933 | Ives | 358/85 |
| 4,485,400 | 11/1984 | Lemelson et al. | 379/53 |
| 4,715,059 | 12/1987 | Cooper-Hart et al. | 379/53 |
| 4,827,339 | 5/1989 | Wada et al. | 358/85 |
| 4,849,811 | 7/1989 | Kleinerman | 358/85 |

OTHER PUBLICATIONS

Luma ™ Video Telephone by Mitsubishi, *Sharper Image*, 7-17-86, 358-85.

*Primary Examiner*—Jin F. Ng
*Assistant Examiner*—Stella L. Woo
*Attorney, Agent, or Firm*—Keith Kline

[57] ABSTRACT

The present invention, the Videophone, is a compact audio/video device that is capable of both sending and receiving audio and visual signals, and is designed to be compatible with standard telephone equipment. The Videophone includes a modified speakerphone, a camera, a viewing screen, and an imaging system based upon a revolving disk of film having a series of holographic apertures which divide the subject image into elements of light. The disk has two bands which are used to alternately scan and reproduce an image. The visual image is process by unique circuitry that can, for ease of manufacture, be contained on a single customized chip. The videophone has the capability to transmit a full motion picture of reasonably good quality. Moreover, audio transmission is not blocked during transmission of the video signal.

4 Claims, 12 Drawing Sheets

VIDEOPHONE

FIELD OF THE INVENTION

This application is a continuation-in-part of copending application, Ser. No. 07/207,385, filed June 15, 1988, now abandoned. The present invention is related to the field of telecommunications and, more specifically, to a device that enables a person to see the person he is speaking to on the telephone.

BACKGROUND OF THE INVENTION

Since the invention of the telephone, people have had a desire to be able to see the person to whom they were speaking. A prerequisite for that wish was the ability to transmit visual images over distances, and to combine both sending and receiving capabilities into a single device. The advance of video technology has made this possible.

It is now easily achievable to create devices that both transmit and receive audio and visual signals. Two such devices that are currently commercially available are the Lumaphone by Mitsubishi and the Stillvideo Picture Phone by Sony. One problem with the devices currently available is that they do not allow full motion video. The devices operate by digitizing a video signal, transmitting that image to a receiving modem, then reconstructing the video image. The transmission time for that process is approximately 6-8 seconds. Thus, the image transmitted is basically a series of "still photos" of relatively poor quality. Further, since the devices are not equipped as speakerphones, the image transmitted will always show the speaker with a handset.

Another disadvantage inherent in the currently available devices is that such devices are relatively large and cumbersome. This reduces the usefulness of such a device in the consumer market.

Another problem with the currently available products is that voice communication is blocked while the video image is being transmitted. While it is desirable to be able to see the person you are conversing with, it is imperative that you be able to speak to him unimpeded by video transmission. The currently available devices block voice transmission for 6-8 seconds each time an image is transmitted.

SUMMARY OF THE INVENTION

Accordingly, it is an object of the present invention to overcome these limitations and disadvantages and allow the construction of a device that is superior in both performance and cost. The present invention enables one skilled in the art to construct a device that is of far greater desirability in the consumer environment.

Briefly, the present invention, the Videophone, is a compact audio/video device that is capable of both sending and receiving audio and visual signals, and is designed to be compatible with standard telephone equipment.

The Videophone includes a modified speakerphone, a camera, a viewing screen, and an imaging system based upon a revolving disk having a series of apertures which divide the subject image into elements of light. The disk has two bands which are used to alternately scan and reproduce an image.

An advantage of the present invention is that it allows the transmission of complete motion pictures, and allows the speaker to speak without using a handset.

Another advantage of the present invention is that video transmission does not interfere with normal voice communication.

Yet another advantage of the Videophone is that it conforms to the size and shape of a standard desk phone.

A further advantage of the present invention is that it is far more economical than the devices currently available.

These and other objects and advantages will become apparent to those skilled in the art in view of the description of the best presently known mode of carrying out the invention and the industrial applicability of the preferred embodiment as described herein and as illustrated in the drawings.

BRIEF DESCRIPTION OF THE DRAWINGS

FIGS. 5b and 5c show the input/output signals for the circuit in FIG. 5a.

FIGS. 10b and 10c show the input/output signals for the buffer in FIG. 10a.

BEST MODE OF CARRYING OUT THE INVENTION

Figure 1:
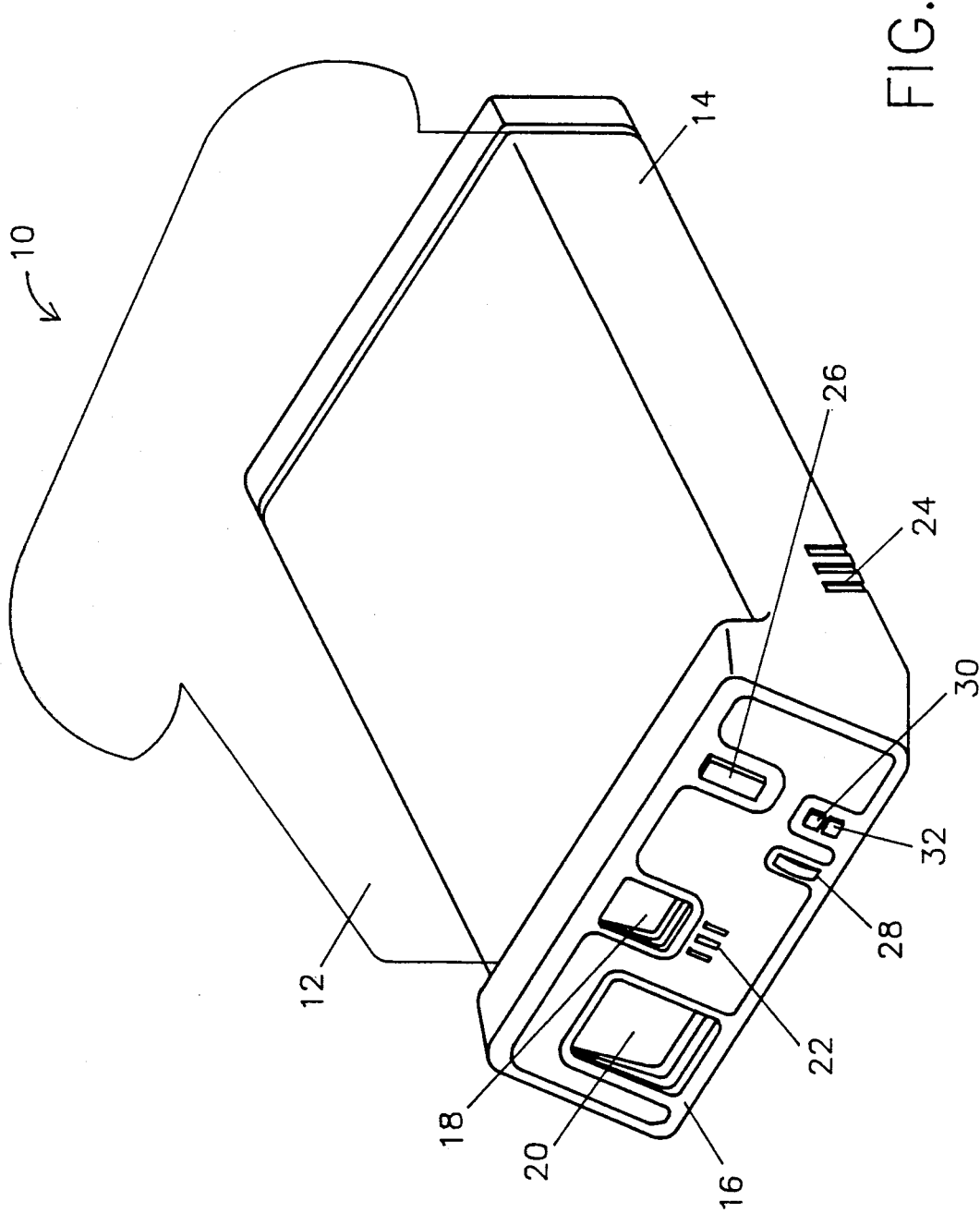
FIG. 1 is a perspective view showing the external features of the Videophone.

The present invention is a Videophone 10 as illustrated in FIG. 1. The Videophone 10 is comprised of a speakerphone 12 and a Videophone body 14. On the front portion of the Videophone body 14 there is a console 16. The body 14 is constructed so that the console 16 is at an approximately 60 degree angle from horizontal. The angle of the console 16 is chosen so as to optimize the viewing angle for a user of the Videophone 10. It is assumed that the most frequent use of the Videophone 10 will be with a person seated at a desk or a table.

Visual transmission is achieved by use of a camera 18 that captures the image to be transmitted, and a display screen 20, that enables viewing of the image. Both the camera 18 and the display screen 20 are located on the console 16.

The audio portion of transmission is accomplished through the use of a microphone 22 located on the console 16 and a speaker 24 located on the body 14.

Also located on the console 16 are the controls for the Videophone 10, including an on/off switch 26, a volume control 28, a "mirror" switch 30, and a "privacy" switch 32.

Figure 2:
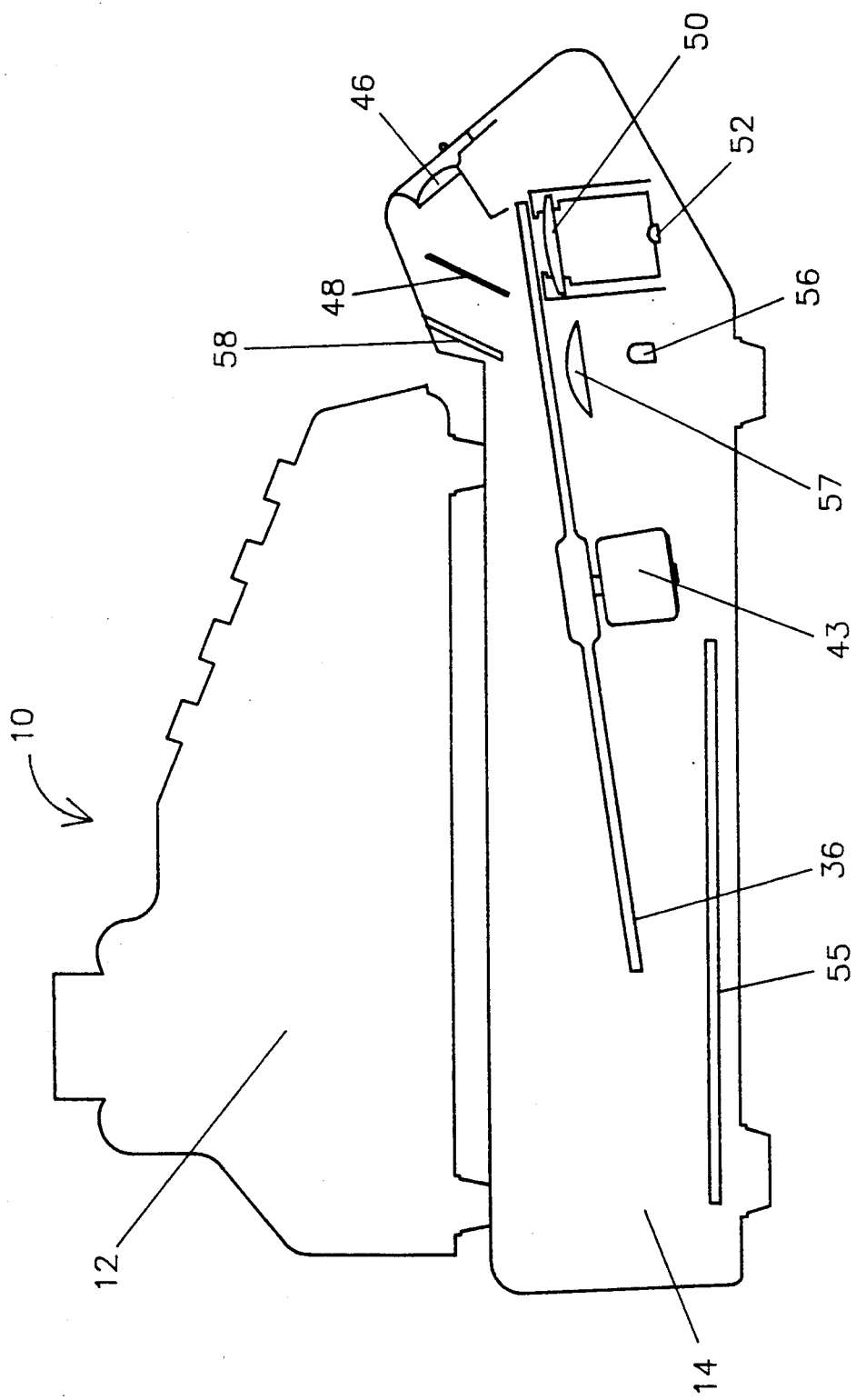
FIG. 2 is a side cutaway view of the Videophone showing its major components.

The internal organization of the Videophone 10 is shown in FIG. 2.

Figure 3:
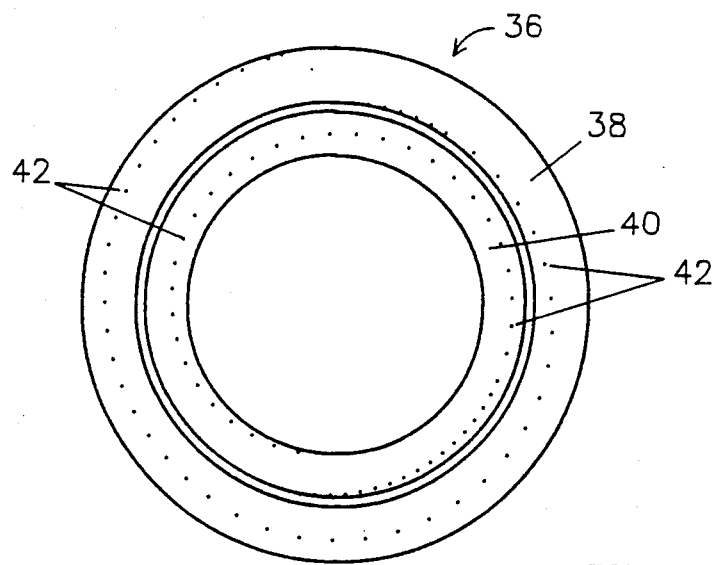
FIG. 3 is a top view of the film disk.

The Videophone operates via an imaging system 31 (Shown in detail in FIG. 6 and described below) which has as a key component a disk 36. The disk 36 is shown in detail in FIG. 3. The disk 36 contains a series of holographic apertures generated by computer, and is produced via photographic means.

The disk 36 has two distinct bands, an image capturing band 38 and an image displaying band 40. Each band 38 & 40 has a series of sixty apertures 42 situated in a spiral pattern around the bands 38 and 40. The apertures are aligned so that the trailing edge of an outer aperture 42 aligns with the leading edge of the next aperture 42 in progression toward the center of the disk.

The computer generated holographic apertures 42 perform three critical functions: (1) They preserve effective aperture size during scanning to ensure a flat field response. (2) They maximize the light gathering capability of the system. (3) They aid in the generation of accurate Time Base data.

During excursions in the optical path of a scanning system, a physical aperture's effective height and width are distorted due to its velocity relative to the subject image. Thus, to transmit video data with this aperture noise present, a higher frequency would be required.

By controlling aperture distortion with the use of computer generated holographic apertures, high frequency video noise and spatial distortion can be eliminated, thus lowering the band width requirement.

The holographic apertures are generated using a computer equipped with optical Ray Tracing software. The process includes producing a corrected image of an aperture at a given moment in time during the rotation of the disk 36. For 60×30 resolution, 30 horizontal aperture drawings are produced for each vertical picture element ("pixel").

These apertures 42 are then plotted on paper and holographically exposed on a disk of film. The resulting product, when rotated and viewed from a masked point, presents apertures that have exactly the desired effective shape. The holographic data can be reproduced by embossing techniques.

In that the apertures 42 are replicated holographically, pin hole diffraction (Mie and Raleigh scattering) is eliminated. This provides a scanned image that is 25-50% brighter than can be obtained using physical pin hole apertures.

Figure 4:
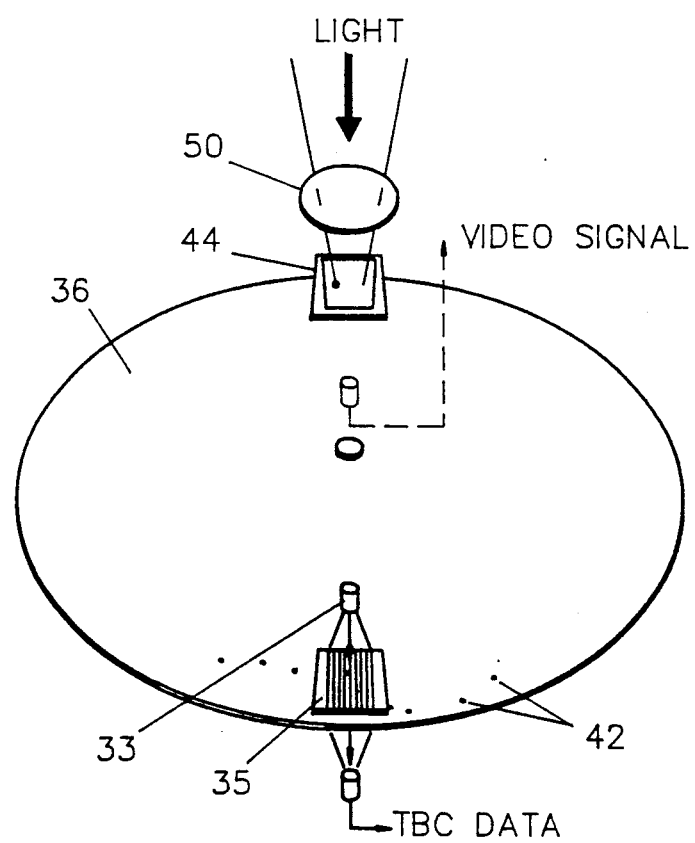
FIG. 4 shows the opto-mechanical elements necessary for TBC data generation.

Moreover, the scan position and action of the holographic apertures 42 is very precise and can be used for Time Base Correction (TBC) data processing, which controls the timing of the rotation of the disk 36. The TBC data is generated (See FIG. 4) by passing light from a TBC LED 33 through an optical grating 35 situated above the apertures 42. The grating 35 is computer generated and photographically reproduced. Detection of the light pulses from the LED 33 allows the system to measure the inaccuracies created by the rotation of the disk at any point in the horizontal and vertical scans.

Figure 5A:
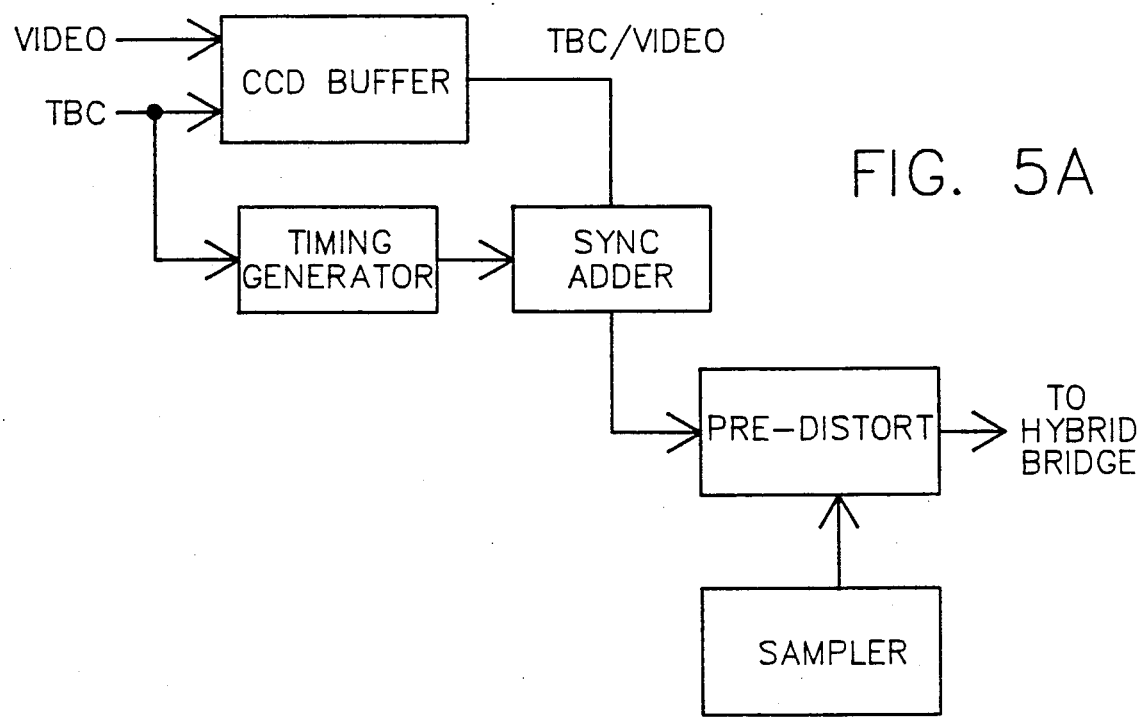
FIG. 5a is the TBC generation circuit.
Figure 5B:
Figure 5C:
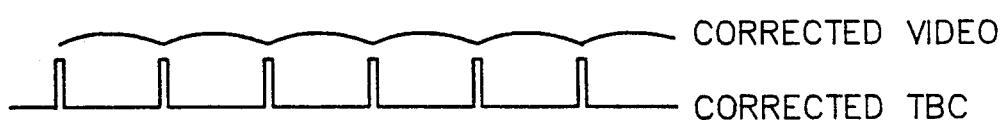

This is accomplished by the TBC circuit shown in FIG. 5a. A horizontal bar pattern consisting of alternating clear and opaque bars, each 1 pixel wide, is created by the circuit. The differentiated edges of the TBC data allow the other portions of the circuitry to easily clock the detection and playback of the image.

Figure 6:
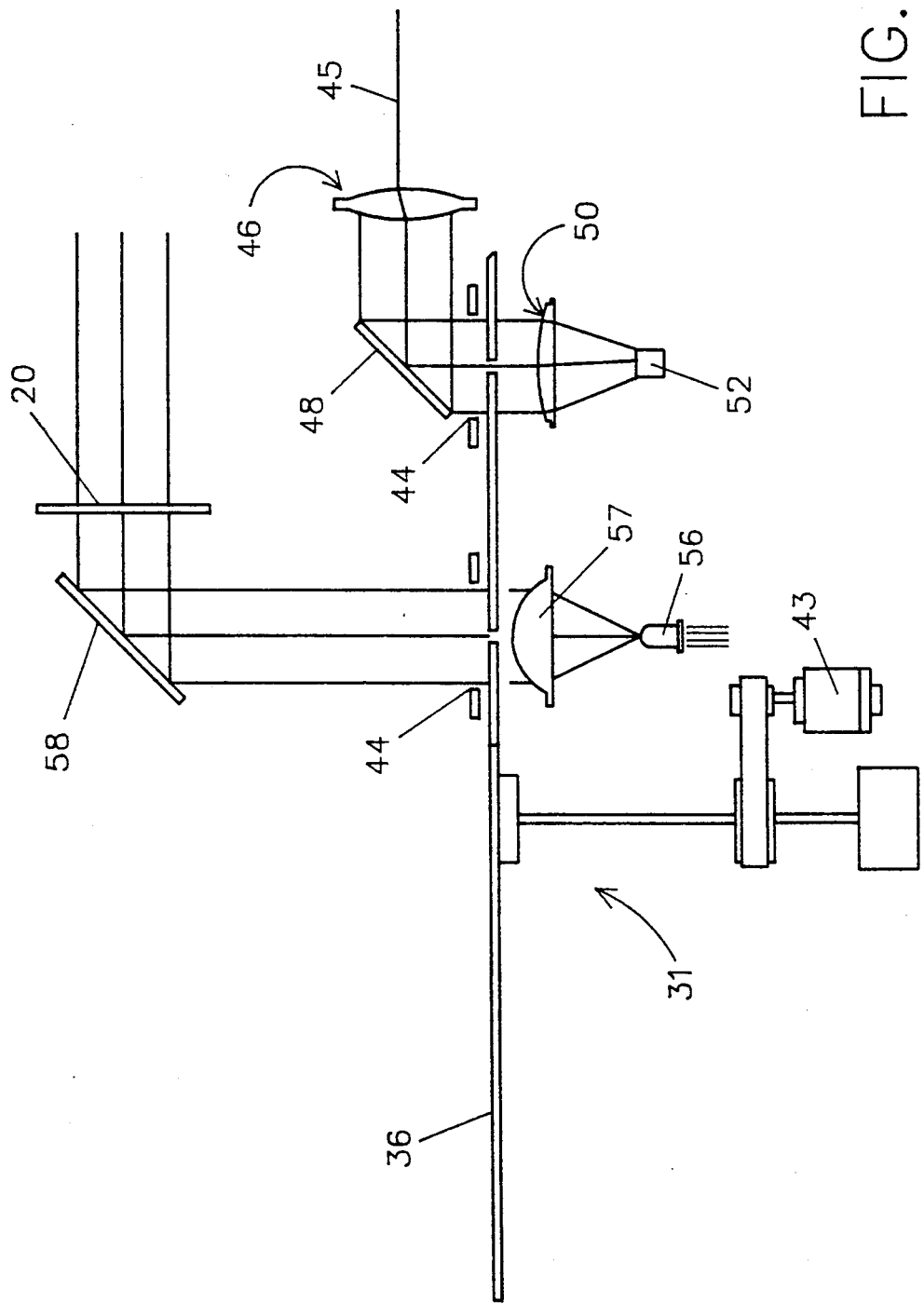
FIG. 6 is a schematic of the opto-mechanical components of the Videophone.

Referring now to FIG. 6, the mechanics of the imaging system operate as follows: The disk 36 is rotated by a motor 43 so that light serially passes through each of the apertures 42 in band 38 or 40, depending on whether an image is being sent or received. Each of the apertures 42 is isolated in turn by one of two masking apertures 44. The masking apertures 44 ensure that light passes through only one aperture 42 at a time.

Reflected light 45 from the subject image is gathered through a camera lens 46. A filter is used to eliminate chromatic aberration of the image that may be caused by the scanning. The lens 46 focuses the light and reflects it off a first mirror 48. The image is then separated into 60 lines by the apertures 42. In the present embodiment 10, each line consists of 30 pixels.

This division into lines is accomplished by the 360 degree rotation of the disk 36. The apertures 42 located on the image capturing band 38 of the disk 36 are situated in a spiral such that, for any given image, the outermost aperture is the first through which the light 45 passes. That part of the light 45 that passes through the outermost aperture is a series of thirty pixels depicting the top one-sixtieth, the first line, of the subject image. As the disk 36 rotates, light 45 passes sequentially through all sixty apertures 42 in the image capturing band 38 so that the subject image is divided into sixty lines of thirty pixels each.

Rotation of the disk 36 is timed so that when transmission of the last pixel of one line is complete, the leading edge of the next aperture 42 will be aligned with the light 45 being sent from the first directing lens 50 through a masking aperture 44. Again, TBC is used to coordinate the spatial exposure of the apertures 42 with the transmission of the signal.

The light 45 as scanned passes through a collecting lens 50 and is directed to a detector 52. The detector 52 then converts the various levels of light intensity into an electrical signal. The signal is then processed by the circuitry located on a printed circuit board 55 and sent via phone line to the receiving Videophone 10. (The processing circuit is described in greater detail following this explanation of the opto-mechanical elements of the invention.)

To display an image, the Videophone 10 essentially reverses the image capturing process. The processed signal is fed to an LED 56. The LED 56 emits light impulses of the appropriate levels of intensity through a diverging lens 57. The diverging lens 57 directs the light to the underside of the disk 36.

In a process parallel to the image capturing process, the light emitted from the LED is divided into lines by the serial exposure to the sixty apertures 42 located on the image displaying band 40 of the disk 36. The light is then reflected off a second mirror 58 and is displayed on the display screen 20 as the subject image. During display, the TBC data ensures proper reproduction of the subject image.

The above description applies to the opto-mechanical portions of the Videophone 10. Converting the light received from the image into an electrical signal, processing the signal, transmitting it, and displaying it as the subject image within the constraints of the band width of telephonic transmission is accomplished by the following:

(1) Pre-scaling the DC video data with an optical feedback loop; (2) Generating the TBC data; (3) Combining the TBC and video data; (4) AC coupling the signal; (5) Pre-distorting the signal for telephone line conditions; (6) Transmitting data via high-lateral isolation hybrid; (7) Receiving data via high-lateral isolation hybrid; (8) Recovering the portions of the signal that had been removed as distortion; (9) Stripping the TBC data; (10) Recovering the video portion as a DC signal; and (11) Displaying the image.

Figure 7:
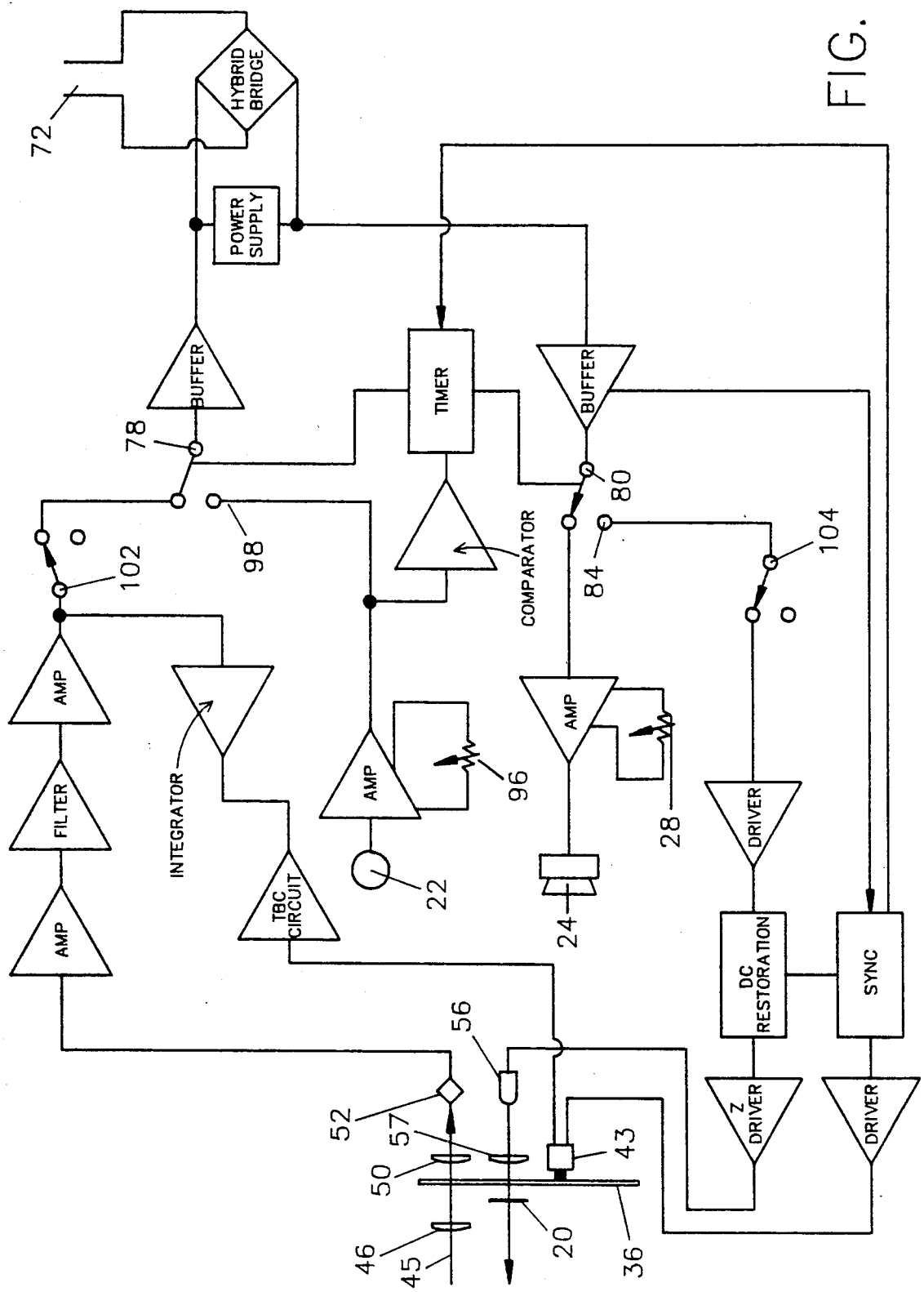
FIG. 7 is a schematic of the Videophone.

FIG. 7 shows the circuit in the state required for transmission of a video image.

The detector 52 generates a current whose strength is proportional to the intensity of the light that has been transmitted through the apertures 42. The current is converted to varying levels of voltage by a first amplifier, processed through a filter, and then amplified by a second inverting amplifier.

The output of the second amplifier is sent to the LED 56 in current mode. The LED 56 illuminates the detector 52 through the optics.

Figure 8:
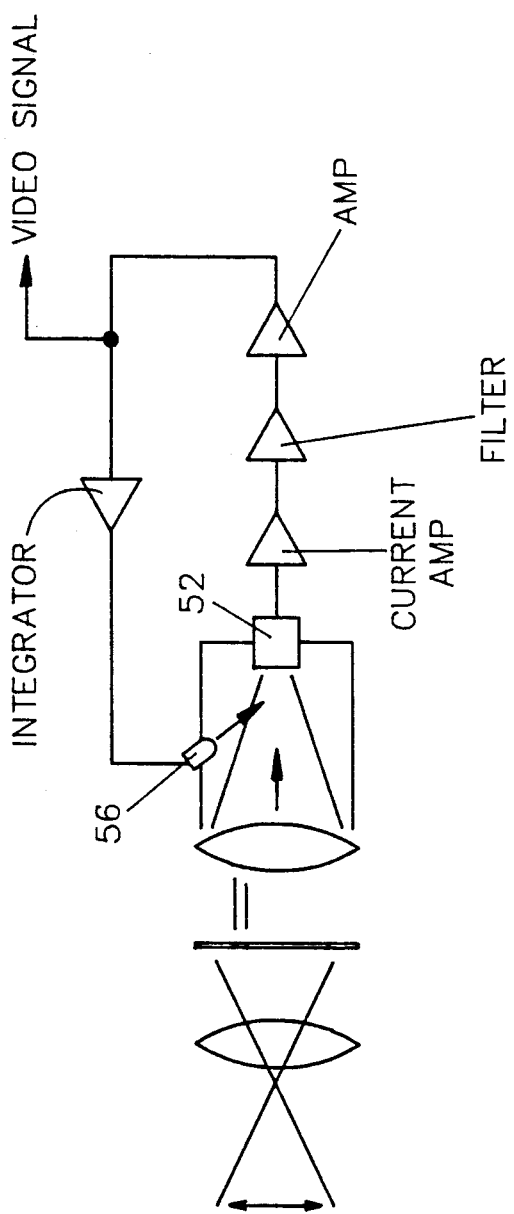
FIG. 8 is a schematic of the optical feedback loop.

This creates an optical feedback loop (See FIG. 8) whereby enough illumination is provided to keep the detector 52 at a nominal bias point. Any light reflected from the subject image causes an instantaneous change in bias. The correcting signal of the servo system represents only the video signal. Furthermore, this active feedback keeps the operation of the detector 52 very linear and well out of its noise region. Since only the video, and not the bias, data is transmitted, the signal has a narrower bandwidth than would ordinarily be expected.

The feedback loop offsets the extreme optical losses in the system. For example, an aperture 42 represents 1/1800th of the image. The system, which operates at 6 frames per second (fps), has an exposure time of 1/10,800th of a second. At this loss level, conventional silicon detectors require at least 500 lux at the subject to image it. The feedback technique described above increases low light sensitivity by a factor of ten so that a subject can be imaged with only 50 lux or less.

The signal then passes through a transmitting buffer where it, the signal originally generated by the camera 18, is converted to a signal that is in a form suitable for transmission on an outgoing phone line 72. By constructing the circuit as described above, an end result equivalent to a 2:1 digital compression is achieved. This allows a video signal to be transmitted within the constraints of the phone line band width.

In the transmitting buffer, the TBC data is used to digitally clock or reconstruct the spatial and temporal character of the data. This operation is performed in analog. The pulses of the TBC data control a CCD Delay line. The values are clocked in based on the perturbations of the disk 36. Digital line and frame data is added as well as black histogram data. The data is then AC coupled and pre-distorted for line conditions.

Consider that operating at 60×30 resolution leads to 1800 pixels per image. Since the system operates at 6 fps, it is operating at 10,800 hz. (At 6 fps the full motion of normal conversation is convincingly conveyed, since no high speed motion is involved.) Since 3600 hz is the highest frequency of the analog phone line operation, the AC coupled data must be integrated so as to not exceed 3600 hz.

Figure 9:
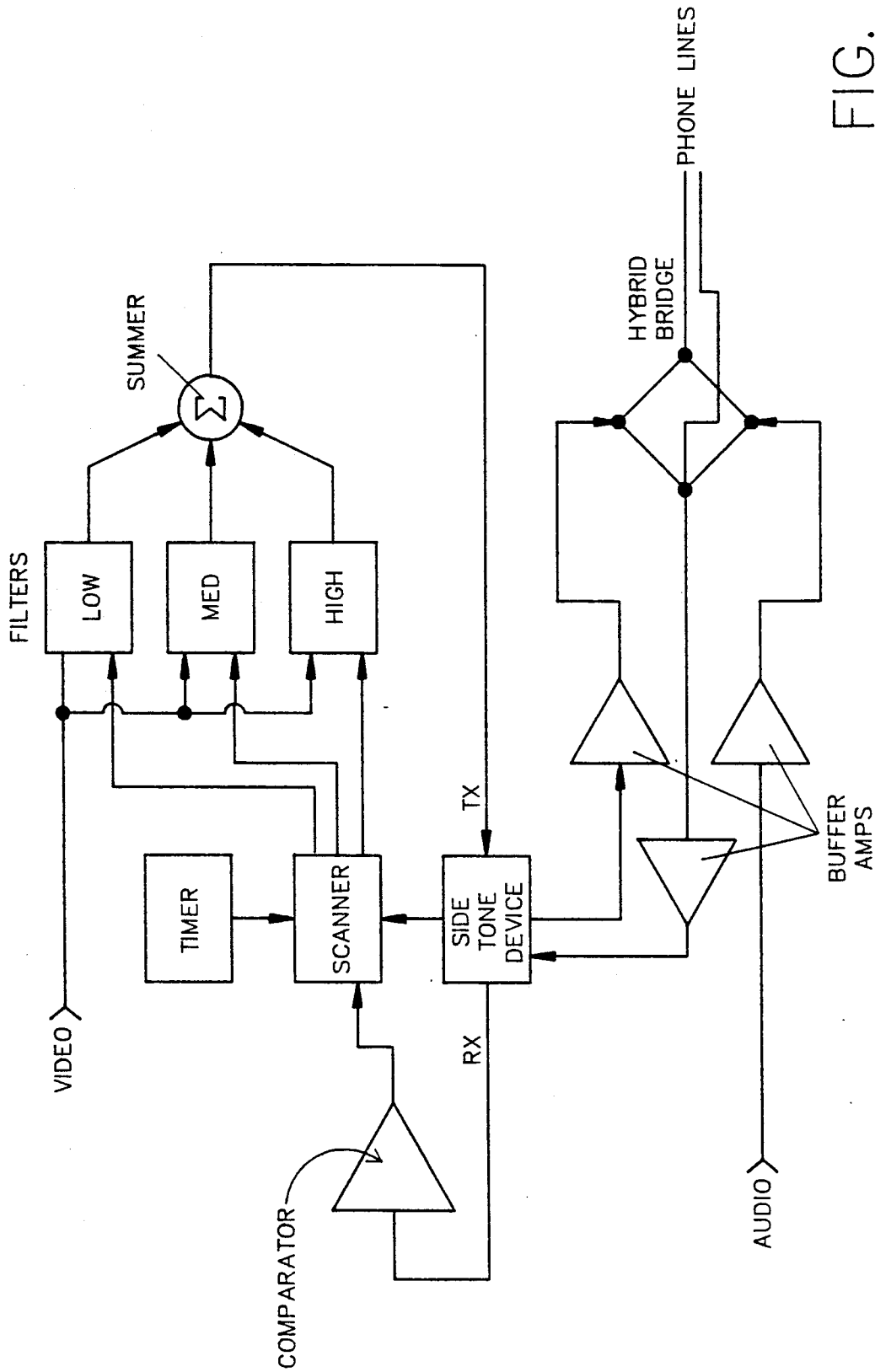
FIG. 9 is a schematic of the compensating hybrid bridge circuit.

The pre-distortion is accomplished with a three band parametric distorter in a hybrid bridge. (See FIG. 9.) The device has two modes of operation, side tone equalization and manual scan. At 30 second intervals, a sequencer checks the line by generation of three tones at two amplitudes Under ordinary conditions, distortion equalization is set automatically, but manual setting can be used when the phone lines are in bad condition.

The signal is then transmitted via the hybrid bridge to the outgoing phone line 72. The hybrid bridge provides the proper interface to the phone line 72 as well as extracting power from a supply to power the circuit.

Note that during transmission of the video signal, a first audio/video switch 78 in the transmitting portion of the circuit 54 is in the video position. A second audio/video switch 80 is in the audio position. The Videophone 10 is designed in this manner so that the person speaking on one Videophone 10 will see the person to whom he is speaking.

Reception of a video signal begins at an incoming phone line 72. The signal is passed through the hybrid bridge and fed to a receiving buffer, where it is isolated from the signal of the receiving phone line 72. In the video receiving mode, the second audio/video switch 80 will direct the signal to the video playback portion of the circuit.

FIG. 7 shows the second audio/video switch 80 in the position necessary for reception of an audio signal. When receiving a video signal, the second audio/video switch 80 would form a connection to node 84 to transmit the signal to the video playback portion of the circuit.

Figure 10A:
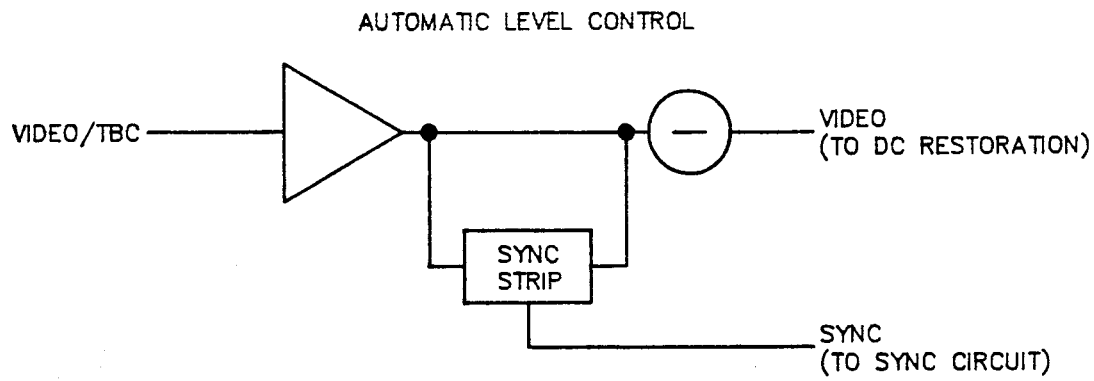
FIG. 10a is a schematic of the receiving buffer.
Figure 10B:
Figure 10C:

In the playback portion of the circuit, the receiving buffer accomplishes two functions (See FIGS. 10a, 10b, 10c): First, it strips the TBC information from the incoming signal to determine whether the signal is audio or video. In receive mode, a video signal has priority. Second, the receiving buffer pre-amplifies and level controls both the audio and video signals.

The signal passes from the receiving buffer through node 84 to a first driver, a DC restoration circuit, and a Z driver. This portion of the circuit 54 restores any DC component of the signal that is lost during transmission through the phone line 72, while converting the signal back into a current. Additionally, the black level is defined by the gaps left by the stripped TBC sync pulses. This helps to linearize the image.

The current is transmitted to the LED 56 which emits light proportional to the strength of the current. The emitted light is in the shades of gray necessary to reconstruct the image.

A receiving synchronization circuit, which can be either a standard synchronization circuit or a TBC circuit, controls the rotation of the disk 36 while the image is being displayed. The receiving synchronization circuit reads the signal from the receiving buffer. A motor driver changes the TBC or sync pulse to a DC current which controls the motor 43. One revolution of the disk 36 corresponds to one image. This embodiment of the Videophone 10 transmits at a rate of 6-10 fps, depending on line type. Therefore the disk 36 rotates at 360-600 RPM.

Figure 11:
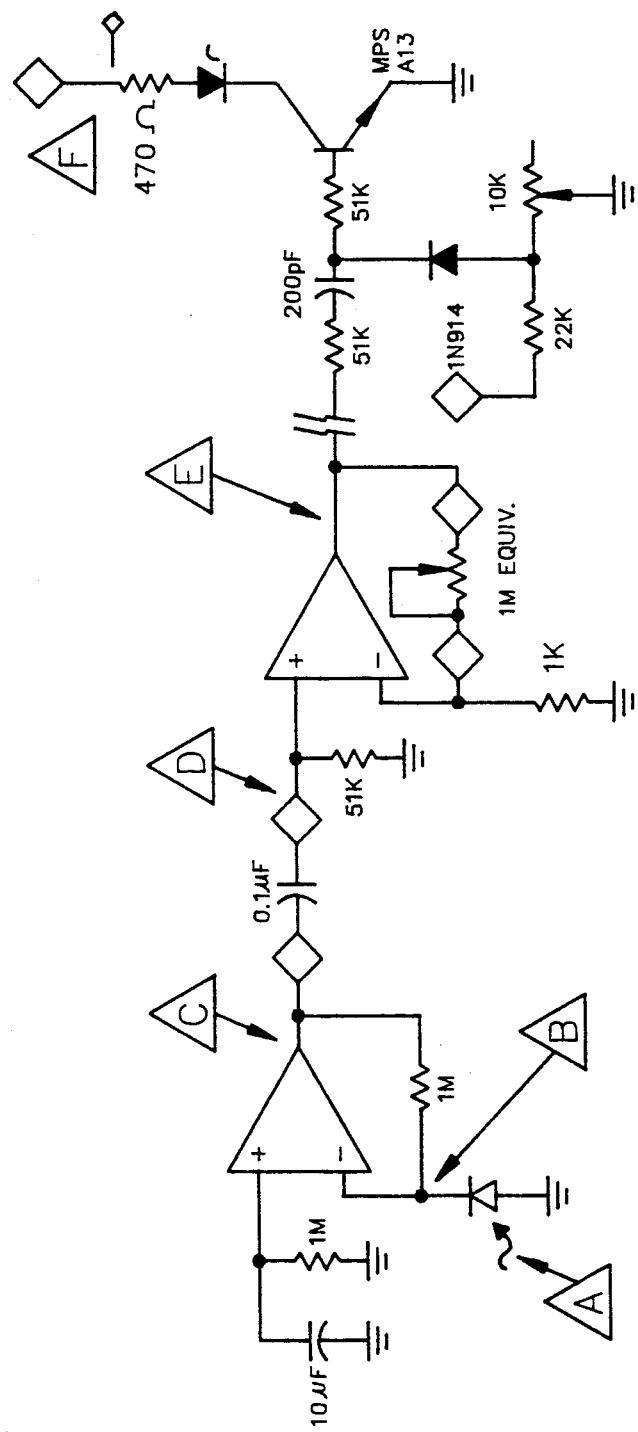
FIG. 11 is a schematic of the amplifier/filter/amplifier and DC restoration portions of the circuit.
Figure 11A:
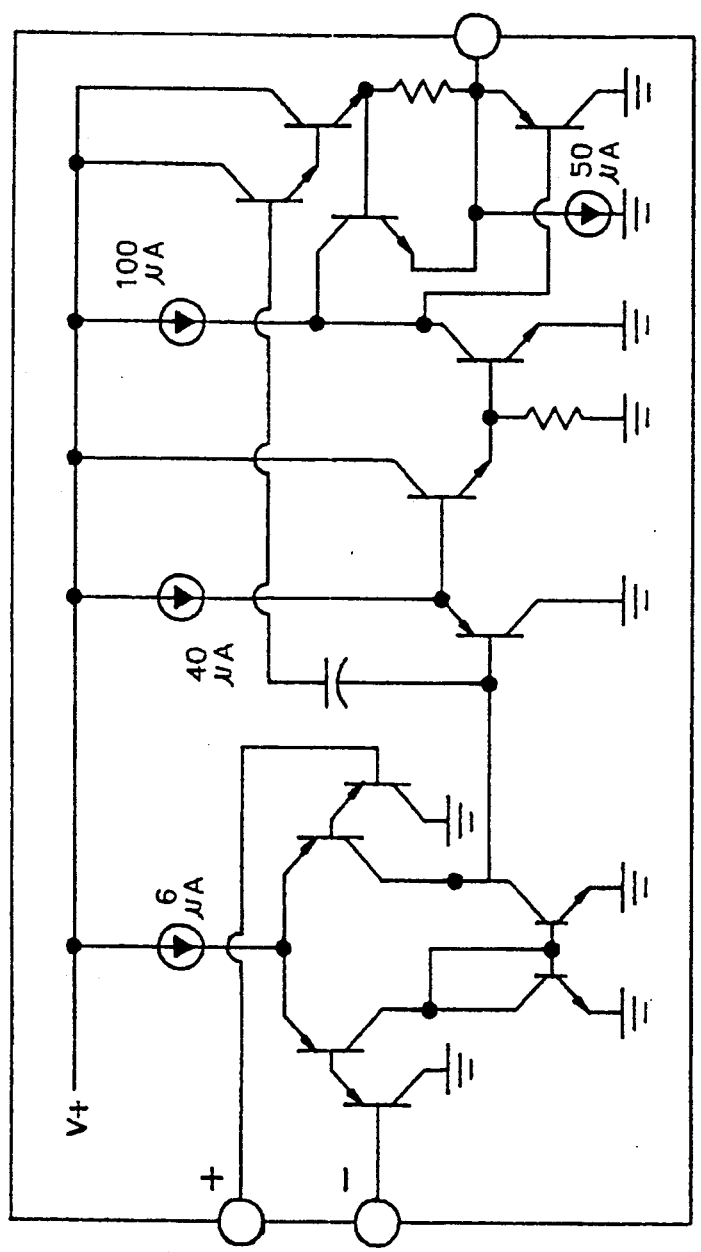
FIG. 11A is a detail of an amplifier.
Figure 12:
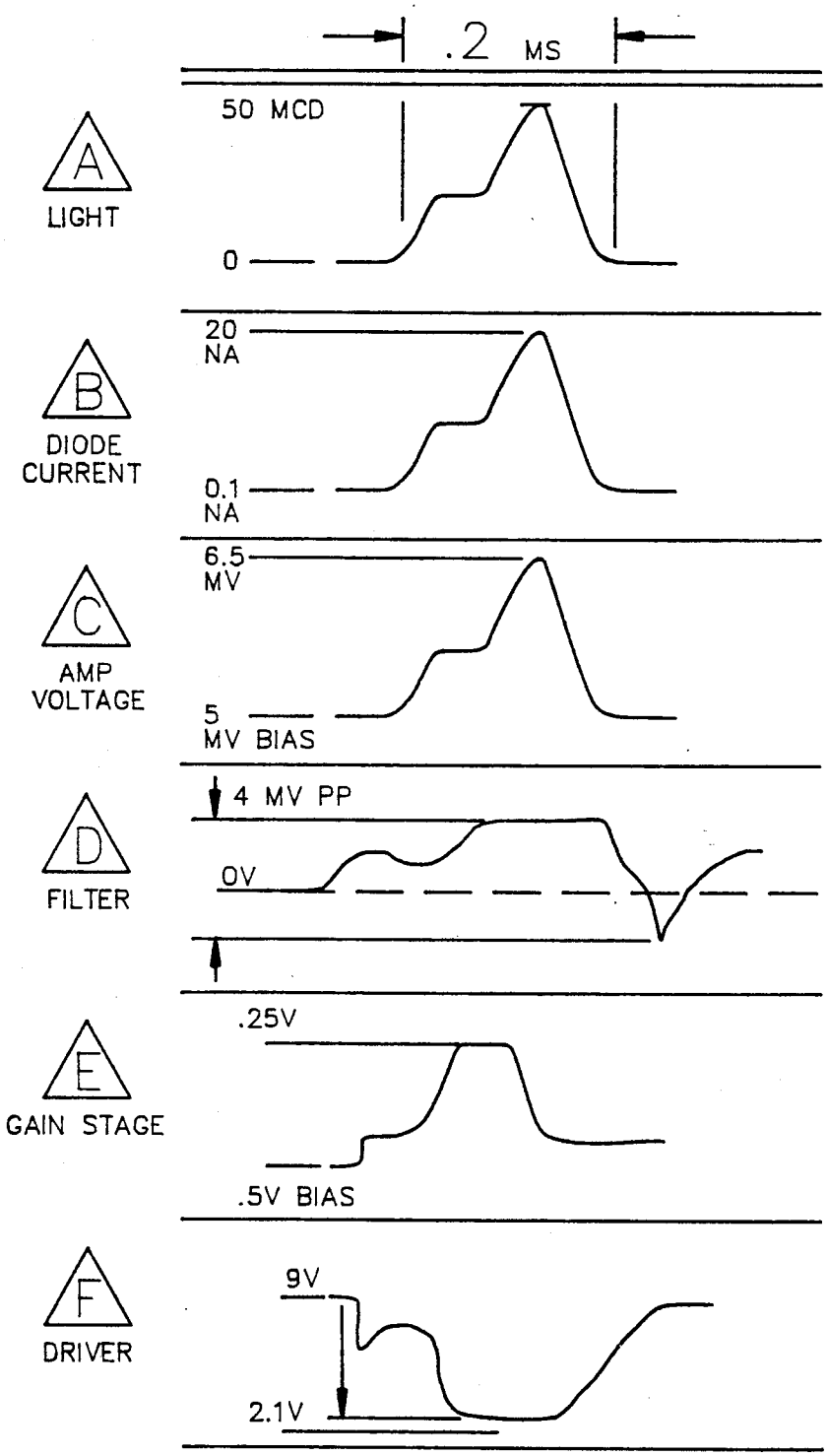
FIG. 12 shows the wave forms at the positions indicated in FIG. 11.

The amplifier/buffer/amplifier portion of the circuit is shown in detail in FIG. 11. FIG. 11A shows further detail of an amplifier. FIG. 12 shows wave forms taken at the positions indicated in FIG. 11.

The audio transmitting portion of the circuit 54 consists of the microphone 22, a third amplifier, and a sensitivity control 96. Again, this circuitry is similar to that of an ordinary speakerphone. To send an audio signal, the first audio/video switch 78 would be in a position to connect to node 98.

When a person using the Videophone 10 speaks, a comparator detects the audio transmission and sets the first audio/video switch 78 so as to connect to node 98, thus disabling video transmission. The comparator in conjunction with a timer ensure that there is no feedback in the system after a person speaks.

During transmission of an audio signal, the signal is taken from the receiving buffer and played back through a fourth amplifier and the speaker 24. Playback volume is controlled by the volume control 28.

The portions of the circuit just described establish the logic of the Videophone 10. That is, audio transmission overrides video transmission. Due to the limitations of the current telephone systems, the Videophone 10 cannot transmit audio and video in the same direction at the same time. The result is that a person speaking will be able to see the listener, but the listener will not be able to see the speaker. If no one is speaking, the parties will be able to see each other. Similarly, if both parties speak at the same time, they will only be heard, not seen, by their counterparts.

Image transmission is continuous and automatic, but controlled by speech. Speech is never impeded for more than 0.2 sec, the switching time for the VOX (voice operated switch, included in the speakerphone). This allows the Videophone to be utilized in applications where seeing facial expressions and hand gestures is critical, such as during a video conference.

In order to permit the person speaking to make sure that he is aligned with the camera 18, the Videophone 10 is equipped with closed-circuit, or mirror, capability.

When the mirror switch 30 is activated, a first closed/line switch 102 and a second closed/line switch 104 are connected to each other. This allows the Videophone 10 to simply play back the image it has transmitted without converting the signal to one suitable for telephone transmission. The signal is transmitted from the imaging portion of the circuit at switch 102 directly to the transmission portion of the circuit at switch 104. Thus, when the mirror switch 30 is activated, the user sees an image of himself, or whatever is aligned with the camera 18.

The Videophone 10 is also equipped with a privacy switch 32. When activated, the privacy switch 32 establishes an open position on the first closed/line switch 102. This disables the video transmission portion of the Videophone 10. Thus, a user will be able to speak to, hear, and see the listener, but will not be seen by the listener.

ALTERNATE EMBODIMENT OF THE INVENTION

An alternate embodiment of the Videophone 10 of the present invention may be constructed by using a CRT in place of the display screen 20. This requires the addition of a CRT power supply and the replacement of the motor driver with an x-y driver. All other components are identical.

The advantage of this alternate embodiment is that the image viewed is of even higher quality. The CRT has a greater viewing angle, and the image is somewhat brighter than that of display screen 20. P7 phosphor is used on the CRT screen to eliminate flicker.

The above disclosures of the Videophone 10 and its alternate embodiment are not intended as limiting. Those skilled in the art will readily observe that numerous modifications and alterations of the device may be made while retaining the teachings of the invention. Accordingly, the above disclosures should be construed as limited only by the metes and bounds of the appended claims.

INDUSTRIAL APPLICABILITY

The present invention is expected to have a very large market. The Videophone 10 allows for transmission of a quality, full motion image. Yet, due to the elegant design of the Videophone's circuitry, the Videophone is far less expensive to manufacture than the devices currently on the market, and thus will be priced far below those devices.

The devices currently available on the market are priced at around $600. It is expected that the Videophone will be sold for approximately $200 with CRT, and about $100 with LED.

Further, the circuitry for the Videophone can be embodied in a single customized chip, thus reducing manufacturing costs even further.

Considering these factors along with the size of the telephone market, it is quite easy to understand why the Videophone technology will enjoy great demand.

What is claimed is:

1. A bidirectional device adaptable to standard telephone equipment, requiring the use of a single telephone line, that will transmit and receive real time, full motion video images comprising:
   a camera;
   a viewing screen;
   an imaging system comprising means for converting light reflected from a subject image into an electrical signal, and further means for converting a transmitted electrical signal into light which is displayed on the screen as the subject image;
   signal processing means; and
   a speakerphone modified to be compatible with the signal processing means and imaging system;
   wherein the imaging system makes use of a rotating disk of film, the disk having holographic images of apertures therein that allow light to pass through the disk in discrete elements;
   and wherein the signal processing means is a circuit to transmit audio signals and to process discrete elements of light representing a video image comprising:
   a real time video transmitting circuit with means to convert light reflected from the full motion subject into an electrical signal capable of being transmitted over a standard telephone line in real time;
   a video receiving circuit with means to convert the signal received over the telephone lines into light that when displayed on the viewing screen forms the subject image;
   an audio transmitting circuit with means to detect sound and transmit it while overriding any video signal that is being transmitted; and
   an audio receiving circuit with means to receive the audio signal and transmit it to a listener while overriding any video signal that is being received; and wherein
   the video transmitting circuit comprises:
   a detector that converts light to electrical current;
   an amplifier, a filter, and a second amplifier in serial circuit to convert the current from the detector to DC voltage;
   a synchronization circuit to coordinate the rotation of the disk with the detection of light while capturing the subject image;
   a buffer and a bridge to convert the DC voltage to an AC current capable of being transmitted over standard phone lines; and the video receiving circuit comprises:
a buffer, a driver, a DC restoration circuit, and a Z driver to convert the signal received from the telephone line into DC current;
an LED which converts the DC current into light representing the subject image; and
a synchronization circuit to coordinate the rotation of the disk with the light emitted from the LED while displaying the image.

2. A circuit to transmit audio signals to process discrete elements of light representing a full motion video image comprising:
a video transmitting circuit with means to convert light reflected from the subject image into an electrical signal capable of being transmitted over standard telephone lines;
a video receiving circuit with means to convert the signal received over the telephone lines into light that when displayed on a viewing screen forms a subject image;
an audio transmitting circuit with means to detect sound and transmit it while overriding any video signal that is being transmitted; and
an audio receiving circuit with means to receive the audio signal and transmit it to a listener while overriding any video signal that is being received; and wherein A. the video transmitting circuit comprises:
a detector that converts light to electrical current;
an amplifier, a filter, and a second amplifier in serial circuit to convert the current from the detector to DC voltage;
a synchronization circuit to coordinate the rotation of a disk with the detection of light while capturing the subject image;
a buffer and a bridge to convert the DC voltage into an AC current capable of being transmitted over standard phone lines; and B. the video receiving circuit comprises:
a buffer, a driver, a DC restoration circuit, and a Z driver to convert the signal received from the telephone line into DC current;
an LED which converts the DC current into light representing the subject image; and
a synchronization circuit to coordinate the rotation of the disk with the light emitted from the LED while displaying the image.

3. A bidirectional device adaptable to standard telephone equipment, requiring the use of a single telephone line, that will transmit and receive real time, full motion video images comprising:
a camera;
a CRT;
an imaging system comprising means for converting light reflected from a full motion subject into a real time electrical signal, and further means for converting a transmitted electrical signal into the subject image displayed on the CRT;
signal processing means; and
a speakerphone modified to be compatible with the signal processing means and imaging system; and wherein
the imaging system makes use of a rotating disk, the disk having holographic images of apertures therein that allow light to pass through the disk in discrete elements; an wherein
the signal processing means is a circuit to transmit audio signals and to process discrete elements of light representing a video image comprising:
a video transmitting circuit with means to convert light reflected from the subject image into an electrical signal capable of being transmitted over standard telephone lines;
a video receiving circuit with means to convert the signal received over the telephone lines into the subject image displayed on the CRT;
an audio transmitting circuit with means to detect sound and transmit it while overriding any video signal that is being transmitted; and
an audio receiving circuit with means to receive the audio signal and transmit it to a listener while overriding any video signal that is being received; and wherein
the video transmitting circuit comprises:
a detector that converts light to electrical current;
an amplifier, a filter, and a second amplifier in serial circuit to convert the current from the detector to DC voltage;
a synchronization circuit to coordinate the rotation of the disk with the detection of light while capturing the subject image;
a buffer and a bridge to convert the DC voltage to an AC current capable of being transmitted over standard phone lines; and
the video receiving circuit comprises:
a buffer, a driver, a DC restoration circuit, and a Z driver to convert the signal received from the telephone line into DC current; and
a synchronization circuit to coordinate the displaying of the image on the CRT.

4. A circuit to transmit audio signals and to process discrete elements of light representing a video image comprising:
a video transmitting circuit with means to convert light reflected from a full motion subject into an electrical signal capable of being transmitted over standard telephone lines;
a video receiving circuit with means to convert the signal received over the telephone lines into the subject image displayed on a CRT;
an audio transmitting circuit with means to detect sound and transmit it while overriding any video signal that is being transmitted; and
an audio receiving circuit with means to receive the audio signal and transmit it to a listener while overriding any video signal that is being received; and wherein A. the video transmitting circuit comprises:
a detector that converts light to electrical current;
an amplifier, a filter, and a second amplifier in serial circuit to convert the current from the detector to DC voltage;
a synchronization circuit to coordinate the rotation of a disk with the detection of light while capturing the subject image;
a buffer and a bridge to convert the DC voltage into an AC current capable of being transmitted over standard phone lines; and B. the video receiving circuit comprises:
a buffer, a driver, a DC restoration circuit, and a Z driver to convert the signal received from the telephone line into DC current; and
a synchronization circuit to coordinate the displaying of the image on the CRT.

* * * * *